Figure 1:
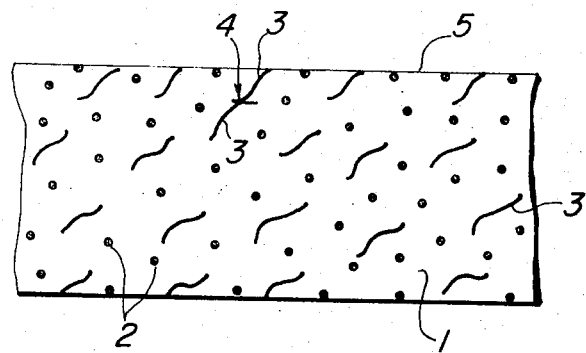

United States Patent [19]
Morisaki

[11] 3,852,203
[45] Dec. 3, 1974

[54] SLIDING BEARING MEMBER

[75] Inventor: Nobukazu Morisaki, Aichi-ken, Japan

[73] Assignee: Daido Metal Company Ltd., Kita-ku, Nagoya, Japan

[22] Filed: Dec. 18, 1973

[21] Appl. No.: 425,895

[30] Foreign Application Priority Data
Aug. 9, 1973  Japan................................ 48-89575

[52] U.S. Cl. ............................................. 252/12
[51] Int. Cl. ..... C10m 5/14, C10m 5/12, C10m 5/10
[58] Field of Search ............ 252/12, 12.2, 12.4, 12.6

[56] References Cited
UNITED STATES PATENTS

| | | | |
|---|---|---|---|
| 2,460,361 | 2/1949 | Petho | 252/12.2 |
| 2,966,459 | 12/1960 | Abel | 252/14 |
| 3,224,967 | 12/1965 | Battista | 252/12 |
| 3,380,843 | 4/1968 | Davis | 252/12.2 |
| 3,523,080 | 8/1970 | Delaplace | 252/12.4 |
| 3,779,918 | 12/1973 | Ikeda | 252/12 |

*Primary Examiner*—Daniel E. Wyman
*Assistant Examiner*—I. Vaughn
*Attorney, Agent, or Firm*—Karl W. Flocks

[57] ABSTRACT

A sliding bearing member comprising:
a. Polyacetal resin base
b. organic fibers
c. hydrocarbon lubricating oil
d. metallic soap
e. solid inorganic lubricant.

6 Claims, 2 Drawing Figures

SLIDING BEARING MEMBER

This invention relates to a sliding member and the manufacturing method thereof, and more particularly to a novel sliding member for use in oilless bearings and the like in which polyacetal resin contains a fiber material having oil affinity and the method for manufacturing said sliding member.

Heretofore, sliding members for bearings and the like have been publicly known in which polyacetal resin contains, in an appropriate manner depending upon the necessity, not only oil lubricant but also solid lubricant additives such as graphite, molybdenum disulfide, and soaps (for example, lithium stearate). However, in the conventional sliding members, oil lubricant alone is dispersed nearly independently in the inner structure of the member.

From a practical point of view, in case of such conventional sliding members, a very small amount of lubricating oil (a very thin oil film) present only on the sliding surface actually performs the lubricating action, and the supply of fresh lubricating oil from within the inner structure cannot be expected as long as the wear in progress does not reach a certain required level. Thus, it is impossible to obtain a satisfactory oil film. Moreover, the publicly known sliding members are considerably inferior in the ability to retain oil, i.e., the property to prevent the escape of oil from within the member.

The present invention resolves such problems of the prior art. In accordance with the present invention, in polyacetal resin is dispersed an oil lubricant uniformly and finely, and moreover, particularly a fiber material having oil affinity, for example, an oil-containing cellulose fiber, can be dispersed more uniformly and finely in the resin.

The present invention provides a sliding member which is capable of performing a smooth lubricating action thanks to the increased amount of oil supplied to the sliding surface from within the resin and the method for manufacturing said sliding member.

If the sliding member in accordance with the present invention is compared with the publicly known sliding members in terms of the self-lubricating action on aliding surface, the former apparently has a larger amount of lubricating oil actually usable on the sliding surface from which the lubricating oil initially flowed out. The fiber pieces having oil affinity used in the present invention, which may be cellulose fiber pieces, are less than about 3 mm. in length by about 15–50 $\mu$ in diameter. They have a strong affinity to oil, and also have a property not only to retain oil therein but to prevent the escape of oil therefrom. The cellulose fibers having oil affinity disclosed, for instance, in Japanese Patent No. 268503 (Japanese Patent Publication No. 8733/1960), U.S. Pat. No. 2,966,459, British Pat. No. 812570, West German Pat. No. 1204028, Australian Pat. No. 247793, Swedish Pat. No. 169869, French Pat. No. 1189108, and the like, are preferably used in the present invention. However, the present invention is not limited to such cellulose fibers, and other fibers having oil affinity can also be used. The length and diameter mentioned above of the fiber having oil affinity to be used in the present invention, need not be limited in said range of value, and may be suitably determined taking the mechanical strength into account. In short, if fiber pieces having oil affinity with extremely large length and diameter are employed, the amount of oil supplied to the sliding surface (slipping surface) will be increased with the resultant improvement in lubricating action. But at the same time, the mechanical strength of formed product will be reduced.

Figure 2:
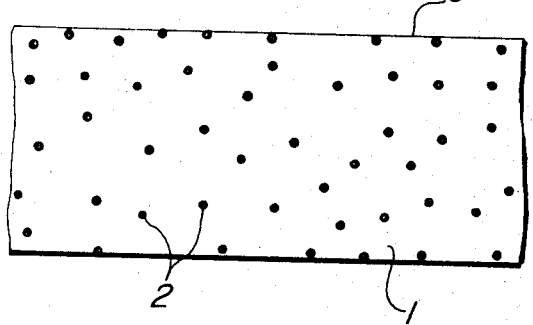

These objects and features of the present invention will become more clear by the following description of the preferred embodiments taking reference with the attached drawings, in which:

FIG. 1 is a structure view showing the section of a sliding member which is an embodiment of the present invention; and FIG. 2 is a structure view illustrating the section of a conventional sliding member.

Throughout the drawings, the like symbols indicate the like or equivalent portions in the figure. The numerals 1 through 3 designate respectively a base made of polyacetal resin and the like, an oil lubricant, and a fiber material having oil affinity.

In Table 1 are shown the influences on bearing performance of mixtures of polyacetal resin and a lubricating oil (SAE No. 30 engine oil) and mixtures of said resin, said lubricating oil, and a fiber material having oil affinity. The test was conducted using a thrust-type friction and wear tester during a test period of 2 hours with a sliding speed of 18 m./min. and a load of 10

Table 1

| Specimen No. | Composition wt. % | | | Bearing Performance | | | Remarks |
|---|---|---|---|---|---|---|---|
| | Resin | Fiber | Lubricating oil | Coefficient of friction | Amount of wear (micron) | Temperature at rear surface of bearing (°C) | |
| 1 | 95 | 0 | 5 | 0.51 | 12 | 33 | Prior art |
| 2 | 90 | 0 | 10 | 0.46 | 11 | 23 | do. |
| 3 | 92 | 3 | 5 | 0.34 | 0 | 15 | This invention |
| 4 | 87 | 3 | 10 | 0.23 | 0 | 12 | do. | than the latter. Thus, in the sliding member of the present invention, it is clear that the frictional heat is limited to a minimum, and the coefficient of friction and the amount of wear can be made smaller.

Another distinguishing feature of the sliding member in accordance with the present invention is that if the temperature of the member is decreased as when the operation of the member is stopped, the lubricating oil will be again absorbed to the fiber having oil affinity kg./cm$^2$.

The specimens No. 1 and No. 2 do not contain the fiber material having oil affinity and were subjected to the test for the purpose of comparison. As is apparent from Table 1, the factor greatly influencing bearing performance is the inclusion of the fiber material having oil affinity in the speciments. The specimens No. 1 and No. 2 not containing the fiber having oil affinity showed bad bearing performances. It is seen that the inferior results were obtained particularly with respect to the amount of wear.

Tables 2 and 3 show the influences of additives on bearing performance when metallic soaps and a solid lubricant are used as additives in the compositions of Table 1.

From the foregoing, a conclusion can be drawn that the factor having a great influence on bearing performance is principally the inclusion of the fiber having oil affinity in the composition of the member. The interaction between the metallic soaps as described above should also be noted. The specimen F not containing the fiber Table 2

| Specimen | Composition wt. % | | | | | Bearing Performance | | | Remarks |
|---|---|---|---|---|---|---|---|---|---|
| | Resin | Fiber | Lubricating oil | Additive | | Coefficient of friction | Amount of wear (micron) | Temperature at rear surface of bearing (°C) | |
| soap | | | | Metallic (a) zinc stearate (b) lithium stearate (c) lead naphthenate | solid lubricant graphite | | | | |
| A | 87 | 3 | 8 | (a) 1 | 1 | 0.24 | 119 | 33.3 | This invention |
| B | 87 | 3 | 8 | (b) 1 | 1 | 0.24 | 72 | 35.8 | do. |
| C | 88 | 3 | 7 | (c) 1 | 1 | 0.21 | 62 | 29.2 | do. |
| D | 88 | 3 | 8 | 0 | 1 | 0.19 | 51 | 26.8 | do. |
| E | 87 | 3 | 7 | (a)+(c) 1+1 | 1 | 0.16 | less than 1 | 21.9 | do. |
| F | 90 | 0 | 8 | (b) 1 | 1 | 0.24 | 466 | 37.9 | Prior art |

Table 3

| Specimen | Composition wt. % | | | | | Bearing Performance | | |
|---|---|---|---|---|---|---|---|---|
| | Resin | Fiber | Lubricating oil | Additive | | Coefficient of friction | Amount of wear (micron) | Temperature at rear surface of bearing (°C) |
| soap | | | | Metallic (a) zinc stearate (b) lithium stearate (c) lead naphthenate | Solid lubricant graphite | | | |
| A | 87 | 3 | 8 | (a) 1 | 1 | 0.11 | 15 | 25.5 |
| B | 87 | 3 | 8 | (b) 1 | 1 | 0.12 | 34 | 30.9 |
| C | 88 | 3 | 7 | (c) 1 | 1 | 0.12 | 83 | 32.2 |
| D | 88 | 3 | 8 | 0 | 1 | 0.11 | 38 | 25.3 |
| E | 87 | 3 | 7 | (a)+(c) 1+1 | 1 | 0.09 | 12 | 23.7 |
| F | 90 | 0 | 8 | (b) 1 | 1 | 0.13 | 16 | 33.7 |

The test of results of which are listed in Table 2 was a so-called high-speed small-load test conducted utilizing the previously mentioned tester during a test period of 2 hours. In the test, a sliding speed of 90 m./min. (1,500 r.p.m.) and a load of 5 kg./cm$^2$. were used. The specimen D not containing the metallic soap was tested for comparison with the specimens A, B, C, and E which are other embodiments of the present invention. The distinct effect of the metallic soaps is clear when the test results of the specimen D are compared with those of the specimen E. This fact shows that there was a strong interaction between the two metallic soaps, the zinc stearate and the lead naphthenate. The specimen F was a conventional product not containing the fiber having oil affinity and was subjected to the test for comparison with the products of the present invention.

having oil affinity showed only unfavorable bearing performance. In particular, the amount of wear of the specimen F is about 4–466 times that of the sliding member in accordance with the present invention. This is an extremely bad result. In the table, the values of the amount of wear are the values expressed in microns of the amounts of wear in the direction of height of the speciments, which were measured after the speciments had been tested for a given period (2 hours) using the previously mentioned tester.

From Table 2, it will be understood that the sliding member in accordance with the present invention is particularly suitable for high-speed small-load applications.

In Table 3 are listed the results of a socalled medium-speed large-load test which was conducted using the previously mentioned tester during a test period of 2 hours with a sliding speed of 18 m./min. and a load of 50 kg./cm².

From the test results shown in Table 3, it may be concluded that the factor considerably influencing bearing performance is principally the inclusion of the fiber material having oil affinity in the composition of the sliding member. As regards the bearing performance, the specimens B, C, and D show small values in the coefficient of friction and the bearing temperature and relatively large values in the amount of wear. Thus, the test results given in Tables 1 through 3 indicate that the sliding member in accordance with the present invention enjoys a much improved bearing performance in comparison with the conventional sliding members not containing said fiber having oil affinity (the specimens No. 1, No. 2, and F). It is also noted that the sliding member of the present invention is particularly suitable for high-speed small-load applications.

Hereinafter detailed explanations will be made on the manufacturing methods and the test results of the products embodying the present invention and the conventional products.

EXAMPLE 1

Specimen No. 1 (conventional product)

A mixture of 95 percent by weight of the polyacetal resin powder (trade name: DURACON M90) and 5 percent weight of the lubricating oil (SAE No. 30 engine oil) was stirred throughly, placed in an aluminum foil container, and heated for 30 minutes at a temperature of 200°C which is higher than the melting point of said resin. After the heating, the mixture was allowed to stand for solidifying. Using a crusher, the solidified mixture was crushed to pellets. Then, the pellets were formed by an injection molding machine to obtain disc-shaped bearing specimens 50mm. in diameter and 7 mm. thick. The specimen No. 1 thus prepared had the bearing performance shown in Table 1.

EXAMPLE 2

Specimen No. 2 (conventional product)

A mixture of 90 percent by weight of said resin powder and 10 percent by weight of said lubricating oil was throughly stirred to obtain the specimen No. 2 using the same procedures as in Example 1. The specimen No. 2 thus prepared had the bearing performance shown in Table 1.

EXAMPLE 3

Specimen No. 3 (product embodying the present invention)

A mixture of 92 percent by weight of said resin powder, 5 percent by weight of said lubricating oil, and 3 percent by weight of the fiber material having oil affinity (trade name: PERMAWICK, the embodiment product of Japanese Patent Publication No. 8733/1960) was throughly stirred for obtaining the specimen No. 3 using the same procedures as in Example 1. The specimen No. 3 had the bearing performance shown in Table 1.

EXAMPLE 4

Specimen No. 4 (product embodying the present invention)

A mixture of 87 percent by weight of said resin powder, 10 percent by weight of said lubricating oil, and 3 percent by weight of said fiber was throughly stirred to obtain the specimen No. 4 using the same procedures as in Example 1. The specimen No. 4 had the bearing performance shown in Table 1.

EXAMPLE 5

Specimen A (product embodying the present invention)

A mixture of 87 percent by weight of said resin, 3 percent by weight of said fiber, 8 percent by weight of said lubricating oil, 1 percent by weight of zinc stearate, and 1 percent by weight of graphite was throughly stirred for obtaining the specimen A using thereafter the same procedures as in Example 1. The specimen A had the bearing performance shown in Tables 2 and 3.

EXAMPLE 6

Specimen B (product embodying the present invention)

A mixture of 87 percent by weight of said resin, 3 percent by weight of said fiber, 8 percent by weight of said lubricating oil, 1 percent by weight of lithium stearate, and 1 percent by weight of graphite was throughly stirred to obtain the specimen B using thereafter the same procedures as in Example 1. The specimen B had the bearing performance shown in Tables 2 and 3.

EXAMPLE 7

Specimen C (product embodying the present invention)

A mixture of 88 percent by weight of said resin, 3 percent by weight of said fiber, 7 percent by weight of said lubricating oil, 1 percent by weight of lead naphthenate, and 1 percent by weight of graphite was throughly stirred for obtaining the specimen C using thereafter the same procedures as in Example 1. The specimen C had the bearing performance shown in Tables 2 and 3.

EXAMPLE 8

Specimen D (product embodying the present invention)

A mixture of 88 percent by weight of said resin, 3 percent by weight of said fiber, 8 percent by weight of said lubricating oil, and 1 percent by weight of graphite was throughly stirred to obtain the specimen D using thereafter the same procedures as Example 1. The specimen D had the bearing performance shown in Tables 2 and 3.

EXAMPLE 9

Specimen E (product embodying the present invention)

A mixture of 87 percent by weight of said resin, 3 percent by weight of said fiber, 7 percent by weight of said lubricating oil, 1 percent by weight of zinc stearate, 1 percent by weight of lead naphthenate, and 1 percent by weight of graphite was throughly stirred for obtaining the specimen E using the same procedures as in Example 1. The specimen E had the bearing performance shown in Tables 2 and 3.

EXAMPLE 10

Specimen F (conventional product)

A mixture of 90 percent by weight of said resin, 8 percent by weight of said lubricating oil, 1 percent by weight of lithium stearate, and 1 percent by weight of graphite was throughly stirred to obtain the specimen F using the same procedures as in Example 1. The specimen F had the bearing performance shown in Tables 2 and 3.

The bearing performance values given in Tables 1 through 3 are the mean values obtained by carrying out the same measurement three times for each one specimen.

The following were the test conditions:

Test Conditions

| | Load kg./cm² | Speed m./min. | Number of Times of Test | Lubrication |
|---|---|---|---|---|
| Embodiments 1 through 4 (Table 1) | 10 | 18 | Three times for each specimen | Dry |
| Embodiments A through F (Table 2) | 5 | 90 | do. | do. |
| Embodiments A through F (Table 3) | 50 | 18 | do. | do. |

Note: Tester used: Thurst-type friction and wear tester.

The inventor conducted a large number of tests in addition to the examples above described. On the basis of these tests, the optimum range of composition of the material of which the sliding member in accordance with the present invention is made, can be determined as follows:

| | | |
|---|---|---|
| Fiber material having oil affinity: | 0.1–15% | by weight |
| Oil lubricant: | 1–15% | do. |
| Solid lubricant: | 0.1–10% | do. |
| Metallic soap: | 0.1–10% | do. |
| Polyacetal resin: | Balance | |

An explanation will be given here on how the upper and lower limits of the above range of composition have been set. If the content of the fiber material having oil affinity exceeds 15 percent, the formability as well as the mechanical strength is decreased. On the other hand, if said content is less than 0.1 percent, a satisfactory lubricating action cannot be expected as the supply of lubricating oil to the sliding surface (slipping surface) is reduced. If the content of the lubricating oil is more than 15 percent, great difficulty will accompany the forming operation. And if the lubricating oil content is less than 1 percent, again a satisfactory lubricating action cannot take place due to the decreased supply of lubricating oil to the sliding surface. Further, if the content of the solid lubricant, for example graphite, exceeds 10 percent, the mechanical strength is decreased. And if the solid lubricant content is less than 0.1 percent, no load durability can be expected. The solid lubricant such as graphite has an additional role as a coloring agent to increase the commodity value of the product member. The upper limit of the metallic soap content is set at 10 percent because if said content exceeds 10 percent, there occurs the plasticizing of the polyacetal resin. The lower limit of the metallic soap content is set at 0.1 percent because no good bearing performance can be expected if said content is less than 0.1 percent.

Needless to say, the metallic soap is used to improve the dispersion and retention of the liquid lubricant in the resin and also to improve the formability so that a high degree of bearing performance can be obtained. A noted effect of the metallic soap is the increased supply of oil lubricant to the sliding surface.

FIGS. 1 and 2 are the structure views (sectional views) of the sliding member in accordance with the present invention and a conventional sliding member. In FIG. 1 is shown the structure of the sliding member of the present invention. The oil lubricant 2 and the fiber material having oil affinity 3 are present in the base 1. At 4 are shown two pieces of the fiber material 3 connected together. In operation, thanks to the frictional heat and the inducing action due to the rotation of shaft, the oil lubricant (not shown) on the sliding surface (slipping surface) 5 takes out the oil lubricant in the resin through the oil-containing fiber pieces having oil affinity 3 joined together at 4 in the resin. Thus, the oil lubricant is supplied to the sliding surface 5. When the rotation of shaft is stopped, the oil lubricant 2 on the sliding surface 5 is again absorbed through the fiber material 3 to the inner structure of the sliding member, and it is retained there without escaping therefrom. The excellent bearing performance described in the foregoing of the sliding member in accordance with the present invention is attained by the provision of such a unique and outstanding oil supply mechanism.

FIG. 2 is a structure view (sectional view) of a sliding member in accordance with the prior art. In FIGS. 1 and 2, the like symbols indicate the like or equivalent portions. The disadvantage of this sliding member lies in that the oil lubricant 2 in the resin cannot be supplied to the sliding surface 5 as long as the wear of said surface does not reach a certain level.

As has been described in the foregoing, the sliding member in accordance with the present invention accomplishes the excellent effects shown in Tables 1 through 3 with the use of the unique lubricating mechanism explained above. It has been noted that the coefficient of friction and the amount of wear are extremely small, and the temperature rise at the rear surface of bearing is also negligible. Thus, the present invention can provide a sliding member which is extremely superior and useful in comparison with the conventional sliding members.

I claim:

1. A sliding member made of a material consisting of 0.1–15 percent by weight of an organic fiber material having a length less than about 3mm. and a diameter of about 15–50 microns and having oil affinity, 1–15 percent by weight of a hydrocarbon lubricating oil, and the balance of polyacetal resin.

2. A sliding member made of a material consisting of 0.1–15 percent by weight of an organic fiber material having a length less than about 3mm. and a diameter of about 15–50 microns and having oil affinity, 1–15 percent by weight of a hydrocarbon lubricating oil, 0.1–10 percent by weight of a metallic soap, and the balance of polyacetal resin.

3. A sliding member made of a material consisting of 0.1–15 percent by weight of an organic fiber material having a length less than about 3mm. and a diameter of about 15–50 microns and having oil affinity, 1–15 percent by weight of a hydrocarbon lubricating oil, 0.1–10 percent by weight of a metallic soap, 0.1–10 percent by weight of a solid inorganic lubricant, and the balance of polyacetal resin.

4. A method of manufacturing a sliding member which comprises mixing and stirring in a container from 0.1–15 percent by weight of an organic fiber having a length less than about 3mm. and a diameter of about 15–50 microns and having oil affinity, from 1–15 percent by weight of a hydrocarbon lubricating oil, and polyacetal resin as the balance, heating to a temperature above the melting point of the resin to melt the composition, solidifying the composition, crushing the solidified composition, molding the crushed composition into a sliding member.

5. A method as set forth in claim 4, wherein the composition additionally contains from 0.1–10 percent by weight of a metallic soap in the mixing and stirring step.

6. A method of claim 5, wherein the composition additionally contains from 0.1–10 percent by weight of a solid inorganic lubricant in the mixing and stirring step.

* * * * *